(12) United States Patent
Kawashima et al.

(10) Patent No.: US 8,711,295 B2
(45) Date of Patent: Apr. 29, 2014

(54) LIQUID CRYSTAL DISPLAY DEVICE

(75) Inventors: Yuki Kawashima, Osaka (JP); Yasutoshi Tasaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 201 days.

(21) Appl. No.: 13/379,695

(22) PCT Filed: Jun. 8, 2010

(86) PCT No.: PCT/JP2010/059651
§ 371 (c)(1),
(2), (4) Date: Dec. 21, 2011

(87) PCT Pub. No.: WO2010/150645
PCT Pub. Date: Dec. 29, 2010

(65) Prior Publication Data
US 2012/0140153 A1    Jun. 7, 2012

(30) Foreign Application Priority Data
Jun. 26, 2009    (JP) ................................ 2009-152706

(51) Int. Cl.
*G02F 1/1343* (2006.01)
(52) U.S. Cl.
USPC .................................. 349/39; 349/38; 349/96
(58) Field of Classification Search
USPC ..................................................... 349/39, 38
See application file for complete search history.

(56) References Cited

U.S. PATENT DOCUMENTS

| | | | |
|---|---|---|---|
| 6,661,488 B1 | 12/2003 | Takeda et al. | |
| 6,952,252 B2 * | 10/2005 | Nakanishi | 349/182 |
| 6,970,222 B2 | 11/2005 | Nakayoshi et al. | |
| 6,977,704 B2 | 12/2005 | Kataoka | |
| 7,113,241 B2 | 9/2006 | Hanaoka | |
| 7,145,622 B2 | 12/2006 | Kataoka et al. | |
| 7,330,222 B2 * | 2/2008 | Shiraki et al. | 349/54 |
| 7,843,531 B2 * | 11/2010 | Nakanishi et al. | 349/93 |

(Continued)

FOREIGN PATENT DOCUMENTS

| | | |
|---|---|---|
| JP | 11-242225 A | 9/1999 |
| JP | 2002-107730 A | 4/2002 |

(Continued)

OTHER PUBLICATIONS

Official Communication issued in International Patent Application No. PCT/JP2010/059651, mailed on Aug. 10, 2010.

(Continued)

*Primary Examiner* — Edward Glick
*Assistant Examiner* — Sang V Nguyen
(74) *Attorney, Agent, or Firm* — Keating & Bennett, LLP

(57) ABSTRACT

A liquid crystal display device includes: an active matrix substrate with a pixel electrode in each of a plurality of pixels; a counter substrate including a counter electrode that opposes the pixel electrode; a liquid crystal layer between the active matrix substrate and the counter substrate; and a pair of polarizers oppose each other via the liquid crystal layer and are in a crossed Nicols arrangement. The pixel electrode- includes a cruciform trunk portion arranged to coincide with polarization axes of the polarizers, a plurality of branch portions extending from the trunk portion, and a plurality of slits between the branch portions. The active matrix substrate further includes an auxiliary electrode which is arranged to oppose the pixel electrode via an insulation layer. The auxiliary electrode and the pixel electrode define a storage capacitor.

7 Claims, 12 Drawing Sheets

(56) References Cited

U.S. PATENT DOCUMENTS

| | | | |
|---|---|---|---|
| 8,068,201 B2 * | 11/2011 | Kawashima et al. | 349/130 |
| 8,149,363 B2 * | 4/2012 | Hashimoto et al. | 349/129 |
| 2002/0159018 A1 * | 10/2002 | Kataoka et al. | 349/143 |
| 2006/0055858 A1 | 3/2006 | Nakanishi et al. | |
| 2007/0045636 A1 * | 3/2007 | Kang et al. | 257/79 |
| 2007/0097279 A1 * | 5/2007 | Sugiura | 349/38 |
| 2007/0103607 A1 * | 5/2007 | Hanaoka et al. | 349/38 |
| 2010/0283952 A1 | 11/2010 | Hashimoto et al. | |

FOREIGN PATENT DOCUMENTS

| | | |
|---|---|---|
| JP | 2002-357830 A | 12/2002 |
| JP | 2003-149647 A | 5/2003 |
| JP | 2003-177418 A | 6/2003 |
| JP | 2003-287753 A | 10/2003 |
| JP | 2006-078968 A | 3/2006 |
| JP | 2006-330638 A | 12/2006 |
| WO | 2009/037835 A1 | 3/2009 |

OTHER PUBLICATIONS

English translation of Official Communication issued in corresponding International Application PCT/JP2010/059651, mailed on Jan. 26, 2012.

* cited by examiner

LIQUID CRYSTAL DISPLAY DEVICE

TECHNICAL FIELD

The present invention relates to a liquid crystal display device and, particularly, to an alignment-divided liquid crystal display device which includes a vertical alignment type liquid crystal layer.

BACKGROUND ART

Recently, as liquid crystal display devices which have wide viewing angle characteristics, transverse electric field mode devices (including IPS mode devices and FFS mode devices) and vertical alignment mode (VA mode) devices are used. The VA mode devices are superior to the transverse electric field mode devices in terms of mass production and therefore have been used in a wide variety of TV applications and mobile applications. The most popular VA mode devices are MVA mode devices. An MVA mode device is disclosed in, for example, Patent Document 1.

In the MVA mode devices, linear alignment control means extending in two mutually-orthogonal directions (slits formed in electrodes or ribs) are provided to form four liquid crystal domains between the alignment control means. The azimuthal angles of the directors which are representative of the respective liquid crystal domains are 45° relative to the polarization axes (transmission axes) of polarizers in a crossed Nicols arrangement. Supposing that the azimuthal angle of 0° is identical with the 3 o'clock direction of the clock dial and that the counterclockwise direction is the positive direction, the azimuthal angles of the directors of the four domains are 45°, 135°, 225°, and 315°. Such a structure in which four liquid crystal domains are formed in one pixel is referred to as "4-domain alignment structure" or simply "4D structure".

For the purpose of improving the response characteristics of the MVA mode, a technology called "Polymer Sustained Alignment Technology", also known as "PSA technology", has been developed. The PSA technology is disclosed in, for example, Patent Documents 2 to 7. In the PSA technology, alignment sustaining layers ("polymer layers") are formed by polymerizing, after assemblage of a liquid crystal cell, photopolymerizable monomers contained in a prepared liquid crystal material in the presence of an applied voltage across the liquid crystal layer, and the resultant alignment sustaining layers are used to cause the liquid crystal molecules to have a pretilt. By adjusting the distribution and intensity of an electric field applied during the polymerization of the monomers, the pretilt azimuths (the azimuthal angles in the substrate plane) and the pretilt angles (the elevation angles relative to the substrate plane) of the liquid crystal molecules can be controlled.

Patent Documents 3 to 7 also disclose a structure which employs a pixel electrode with a fine stripe pattern in combination with the PSA technology. In this structure, when a voltage is applied across the liquid crystal layer, liquid crystal molecules are aligned parallel to the longitudinal direction of the stripe pattern. This contrasts with the conventional MVA mode described in Patent Document 1 in which liquid crystal molecules are aligned in a direction perpendicular to a linear alignment control structure, such as slits or ribs. The line-and-space of the fine stripe pattern (hereinafter, sometimes referred to as "comb tooth-like fine electrode configuration") may be smaller than the width of the alignment control means of the conventional MVA mode devices. Therefore, the comb tooth-like fine electrode configuration is advantageous in that it can more readily be applied to small size pixels than the conventional MVA mode alignment control means.

FIG. 12 shows a liquid crystal display device 500 of the prior art which includes a pixel electrode 512 that has a comb tooth-like fine electrode configuration. FIG. 12 is a plan view schematically showing a region corresponding to one pixel of the liquid crystal display device 500.

The pixel electrode 512 of the liquid crystal display device 500 includes, as shown in FIG. 12, a cruciform trunk portion 512a which is arranged so as to coincide with the polarization axes P1 and P2 of a pair of polarizers (not shown) which are in a crossed Nicols arrangement, a plurality of branch portions 512b extending from the trunk portion 512a in directions of approximately 45°, and a plurality of slits 512c provided between the plurality of branch portions 512b. The pixel electrode 512 is electrically coupled to a thin film transistor (TFT) 514. In FIG. 12, a top gate type TFT 514 is shown.

The TFT 514 is supplied with a scan signal from a scan line 515 and an image signal from a signal line 516. In the configuration shown in FIG. 12, the scan line 515 is provided so as to transverse the center of the pixel. The gate electrode GE of the TFT 514 is formed so as to branch off from the scan line 515. The pixel electrode 512 is electrically coupled to the drain electrode DE of the TFT 514.

As shown in FIG. 12, the liquid crystal display device 500 includes a storage capacitor line 518 and a storage capacitor electrode $C_SE$. The storage capacitor line 518 is formed of the same conductive film as a scan line 515 (i.e., at the same level as the scan line 515). The storage capacitor electrode $C_SE$ is formed of the same conductive film as a semiconductor layer SL of the TFT 514 (i.e., at the same level as the semiconductor layer SL). The storage capacitor line 518 is supplied with a potential that is equal to that of the counter electrode (which is arranged so as to oppose the pixel electrode 512). On the other hand, the storage capacitor electrode $C_SE$ is supplied with a potential that is equal to that of the pixel electrode 512.

As schematically shown in FIG. 13, the pixel electrode 512, the counter electrode that is arranged so as to oppose the pixel electrode 512, and a liquid crystal layer interposed therebetween are configured to form a liquid crystal capacitor $C_{LC}$. On the other hand, the storage capacitor electrode $C_SE$, the storage capacitor line 518 (more strictly, part of the storage capacitor line 518 extending over the storage capacitor electrode $C_SE$), and an insulation layer interposed therebetween are configured to form a storage capacitor $C_S$.

When a voltage is applied between the pixel electrode 512 that has the above-described comb tooth-like fine electrode configuration and the counter electrode, an oblique electric field is produced in each slit 512c (i.e., a space where the conductive film of the pixel electrode 512 does not exist). Such an oblique electric field defines the azimuth in which the liquid crystal molecules incline (the azimuthal angle component of the long axes of the liquid crystal molecules inclined by the electric field), and four (four types of) liquid crystal domains are formed in the liquid crystal layer in each pixel. The alignment azimuths of the liquid crystal molecules in the respective ones of the four liquid crystal domains are different from one another, so that the azimuthal angle dependence of the viewing angle is decreased, and display of wide viewing angles is realized.

CITATION LIST

Patent Literature

Patent Document 1: Japanese Laid-Open Patent Publication No. 11-242225

Patent Document 2: Japanese Laid-Open Patent Publication No. 2002-357830
Patent Document 3: Japanese Laid-Open Patent Publication No. 2003-149647
Patent Document 4: Japanese Laid-Open Patent Publication No. 2006-78968
Patent Document 5: Japanese Laid-Open Patent Publication No. 2003-177418
Patent Document 6: Japanese Laid-Open Patent Publication No. 2003-287753
Patent Document 7: Japanese Laid-Open Patent Publication No. 2006-330638

SUMMARY OF INVENTION

Technical Problem

In recent years, from the viewpoints of visibility and energy conservation, it has been demanded that middle-size and small-size liquid crystal display devices have still higher transmittance.

However, when using the pixel electrode 512 that has the above-described comb tooth-like fine electrode configuration, a sufficient voltage cannot be applied across portions of the liquid crystal layer corresponding to the slits 512c in which the conductive film does not exist, so that loss of transmittance (decrease in transmittance) in the presence of an applied voltage disadvantageously occurs. When the storage capacitor $C_S$ which includes a nontransparent element, such as the storage capacitor line 518, is provided, the aperture ratio of the pixels decreases, and this also causes a decrease of the transmittance.

The present invention was conceived in view of the above disadvantages. One of the objects of the present invention is to improve the light transmittance of an alignment-divided liquid crystal display device which includes a vertical alignment type liquid crystal layer and in which pixel electrodes have a comb tooth-like fine electrode configuration.

Solution to Problem

A liquid crystal display device of the present invention is a liquid crystal display device which has a plurality of pixels arrayed in a matrix arrangement, including: an active matrix substrate which includes a pixel electrode provided in each of the plurality of pixels; a counter substrate which has a counter electrode that is arranged so as to oppose the pixel electrode; a vertical alignment type liquid crystal layer interposed between the active matrix substrate and the counter substrate; and a pair of polarizers which are arranged so as to oppose each other via the liquid crystal layer and which are in a crossed Nicols arrangement, wherein the pixel electrode includes a cruciform trunk portion which is arranged so as to coincide with polarization axes of the pair of polarizers, a plurality of branch portions extending from the trunk portion in a direction of approximately 45°, and a plurality of slits provided between the plurality of branch portions, the active matrix substrate further includes an auxiliary electrode which is arranged so as to oppose the pixel electrode via an insulation layer, the auxiliary electrode and the pixel electrode being configured to form a storage capacitor, the auxiliary electrode has a shape which does not substantially overlap the plurality of slits of the pixel electrode when viewed in a direction normal to a display surface.

In a preferred embodiment, the auxiliary electrode is supplied with a potential which is equal to that of the counter electrode.

In a preferred embodiment, the auxiliary electrode is made of a transparent conductive material.

In a preferred embodiment, the auxiliary electrode has a shape which is substantially the same as the trunk portion and the plurality of branch portions of the pixel electrode.

In a preferred embodiment, the active matrix substrate further includes a thin film transistor which is electrically coupled to the pixel electrode, the thin film transistor includes a semiconductor layer, and the auxiliary electrode is made of a semiconductor material which is the same as the semiconductor layer of the thin film transistor.

In a preferred embodiment, the active matrix substrate further includes a coupling electrode for electrically coupling the auxiliary electrodes between adjacent pixels.

In a preferred embodiment, in the presence of an applied voltage between the pixel electrode and the counter electrode, four liquid crystal domains are formed in the liquid crystal layer in each of the plurality of pixels, azimuths of four directors that are representative of orientations of liquid crystal molecules included in respective ones of the four liquid crystal domains are different from one another, and each of the azimuths of the four directors is generally parallel to any of the plurality of branch portions.

In a preferred embodiment, the four liquid crystal domains include a first liquid crystal domain in which the azimuth of the director is a first azimuth, a second liquid crystal domain in which the azimuth of the director is a second azimuth, a third liquid crystal domain in which the azimuth of the director is a third azimuth, and a fourth liquid crystal domain in which the azimuth of the director is a fourth azimuth, a difference between any two of the first, second, third and fourth azimuths being generally equal to an integral multiple of 90°, and azimuths of directors of liquid crystal domains which are adjacent to each other with the trunk portion interposed therebetween are different by about 90°.

In a preferred embodiment, the liquid crystal display device of the present invention further includes: a pair of vertical alignment films which are provided between the pixel electrode and the liquid crystal layer and between the counter electrode and the liquid crystal layer; and a pair of alignment sustaining layers provided on surfaces of the pair of vertical alignment films which are closer to the liquid crystal layer, the pair of alignment sustaining layers being made of a photopolymerized material.

Advantageous Effects of Invention

According to the present invention, the light transmittance of an alignment-divided liquid crystal display device which includes a vertical alignment type liquid crystal layer, and in which pixel electrodes have a comb tooth-like fine electrode configuration, can be improved.

DESCRIPTION OF EMBODIMENTS

When a pixel electrode which has a comb tooth-like fine electrode configuration is used, it is difficult to essentially prevent loss of transmittance which is attributed to slits. In a liquid crystal display device of the present invention, loss of transmittance which is attributed to the storage capacitor is reduced, whereby the transmittance is improved. Hereinafter, embodiments of the present invention will be described with reference to the drawings. Note that the present invention is not limited to the embodiments which will be described below.

Embodiment 1

Figure 1:
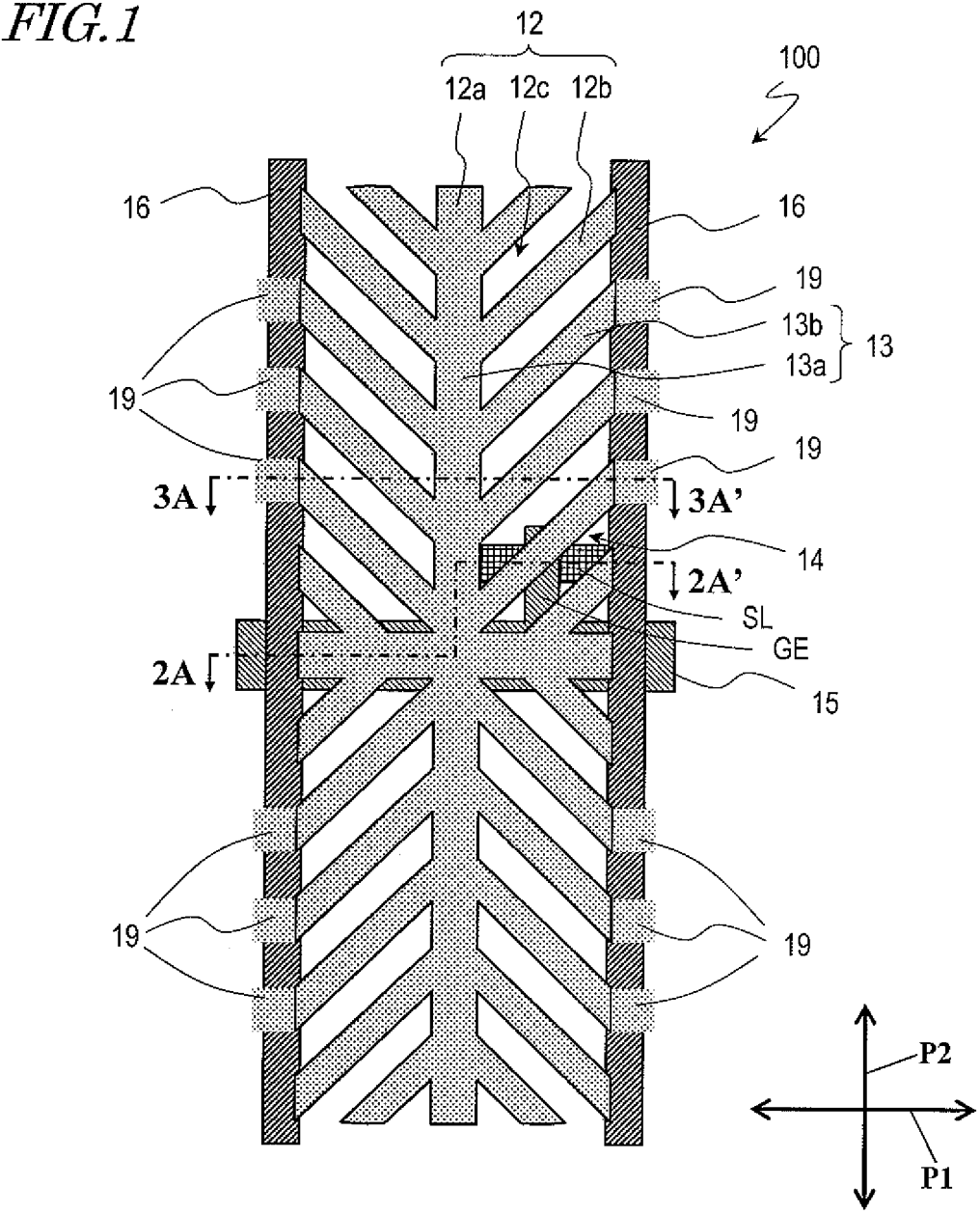
FIG. 1 A plan view schematically showing a liquid crystal display device 100 in a preferred embodiment of the present invention.
Figure 2:
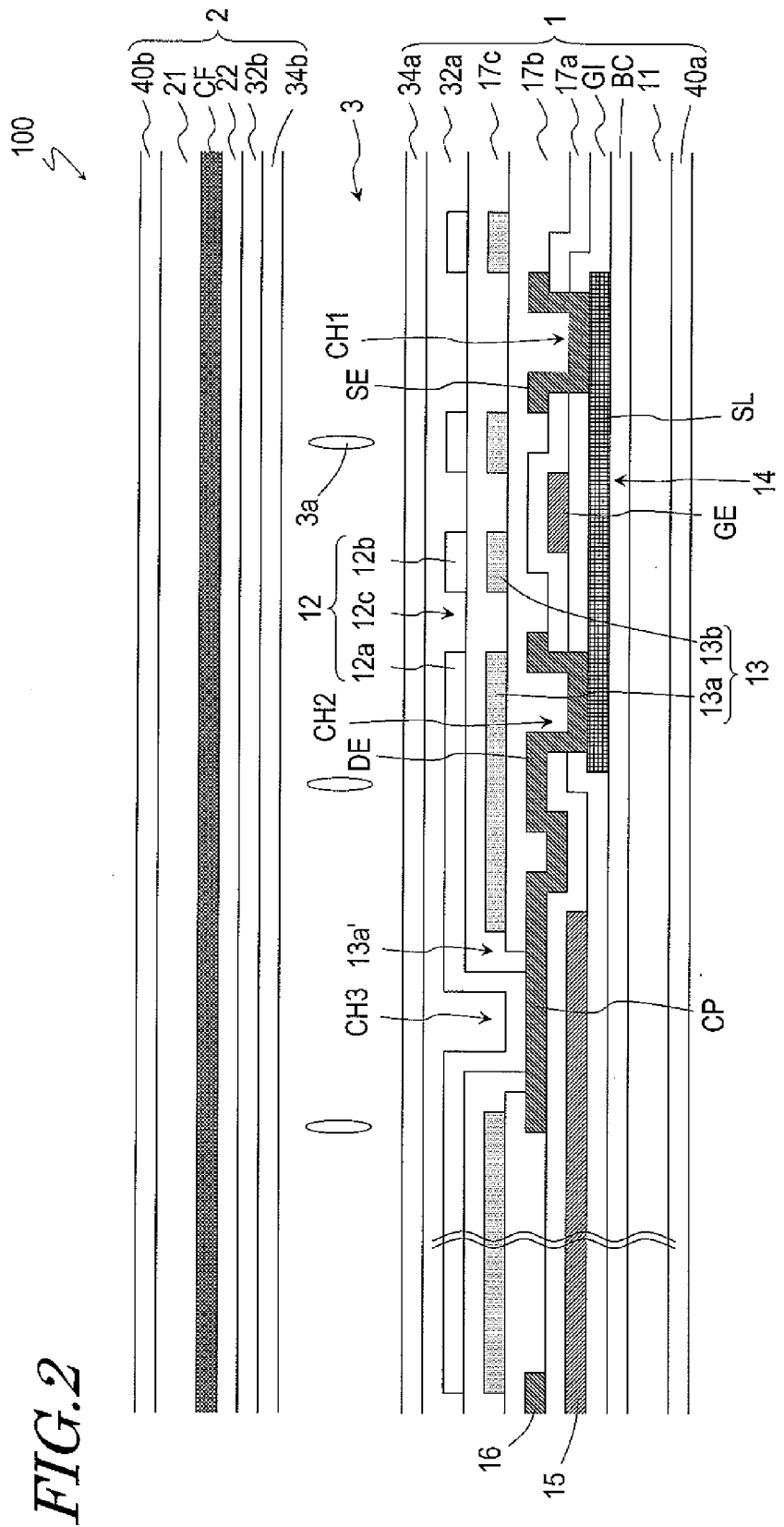
FIG. 2 A cross-sectional view schematically showing the liquid crystal display device 100 in a preferred embodiment of the present invention, which is taken along line 2A-2A' of FIG. 1.
Figure 3:
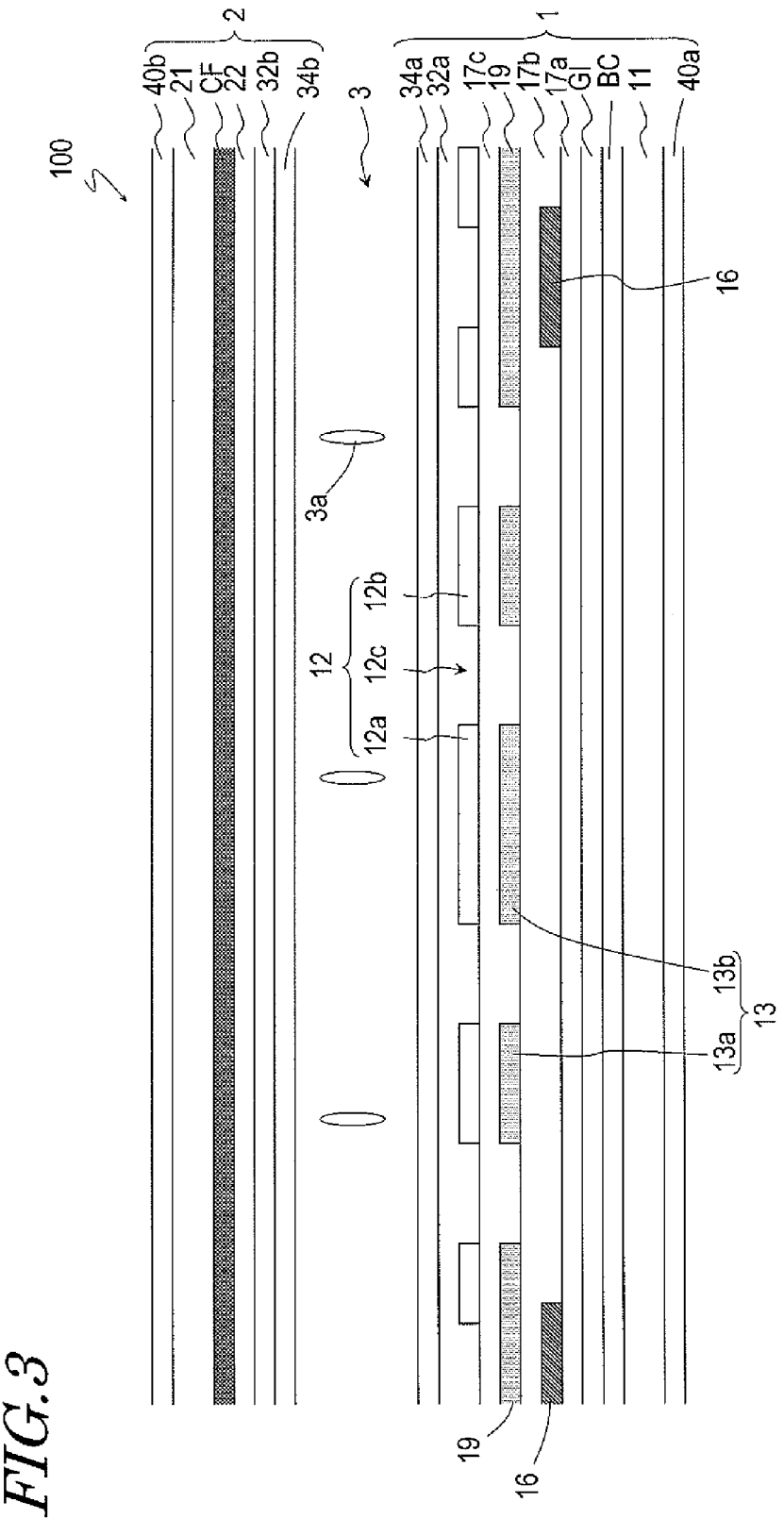
FIG. 3 A cross-sectional view schematically showing the liquid crystal display device 100 in a preferred embodiment of the present invention, which is taken along line 3A-3A' of FIG. 1.

FIG. 1, FIG. 2 and FIG. 3 show a liquid crystal display device 100 of the present embodiment. The liquid crystal display device 100 has a plurality of pixels which are arrayed in a matrix arrangement. FIG. 1 is a plan view schematically showing a region corresponding to one pixel of the liquid crystal display device 100. FIG. 2 and FIG. 3 are cross-sectional views taken along line 2A-2A' and line 3A-3A', respectively, of FIG. 1.

The liquid crystal display device 100 includes, as shown in FIG. 2 and FIG. 3, an active matrix substrate (hereinafter, referred to as "TFT substrate") 1, a counter substrate (also known as "color filter substrate") 2 which is arranged so as to oppose the TFT substrate 1, and a vertical alignment type liquid crystal layer 3 which is interposed between these substrates. The TFT substrate 1 includes pixel electrodes 12 which are provided in respective ones of the plurality of pixels. On the other hand, the counter substrate 2 includes a counter electrode 22 which is arranged so as to oppose the pixel electrodes 12. The liquid crystal layer 3 includes liquid crystal molecules 3a of negative dielectric anisotropy.

The liquid crystal display device 100 further includes a pair of polarizers 40a and 40b which are arranged so as to oppose each other via the liquid crystal layer 3. The pair of polarizers 40a and 40b are in a crossed Nicols arrangement. Specifically, as shown in FIG. 1, the polarization axis (transmission axis) P1 of one polarizer 40a and the polarization axis (transmission axis) P2 of the other polarizer 40b are perpendicular to each other.

The pixel electrode 12 includes, as shown in FIG. 1, a cruciform trunk portion 12a which is arranged so as to coincide with the polarization axes P1 and P2 of the pair of polarizers 40a and 40b, a plurality of branch portions 12b extending from the trunk portion 12a in directions of approximately 45°, and a plurality of slits 12c provided between the plurality of branch portions 12b. Thus, the pixel electrode 12 of the liquid crystal display device 100 has a so-called comb tooth-like fine electrode configuration.

Between the pixel electrode 12 and the liquid crystal layer 3 and between the counter electrode 22 and the liquid crystal layer 3, a pair of vertical alignment films 32a and 32b are provided as shown in FIG. 2 and FIG. 3. Surfaces of the vertical alignment films 32a and 32b which are closer to the liquid crystal layer 3 are provided with a pair of alignment sustaining layers 34a and 34b which are made of a photopolymerized material.

The alignment sustaining layers 34a and 34b may be formed by polymerizing a photopolymerizable compound (typically, a photopolymerizable monomer) which is contained in a prepared liquid crystal material in the presence of an applied voltage across the liquid crystal layer 3 after formation of a liquid crystal cell. Before the polymerization of the photopolymerizable compound, the orientation of the liquid crystal molecules 3a contained in the liquid crystal layer 3 is regulated by the vertical alignment films 32a and 32b. When a sufficiently high voltage (e.g., white display voltage) is applied across the liquid crystal layer 3, the liquid crystal molecules 3a incline in predetermined azimuths due to oblique electric fields which are attributed to the comb tooth-like fine electrode configuration of the pixel electrode 12. The alignment sustaining layers 34a and 34b function to sustain (memorize) an alignment of the liquid crystal molecules 3a which occurs in the presence of an applied voltage across the liquid crystal layer 3 even after removal of the voltage (in the absence of an applied voltage). Therefore, the pretilt azimuths of the liquid crystal molecules 3a which are defined by the alignment sustaining layers 34a and 34b (the azimuths in which the liquid crystal molecules 3a incline in the absence of an applied voltage) conform to the azimuths in which the liquid crystal molecules 3a incline in the presence of an applied voltage. The alignment sustaining layers 34a and 34b may be formed using a known PSA technique (for example, disclosed in Patent Documents 2 to 7).

In the liquid crystal display device 100, the pixel electrode 12 has the above-described comb tooth-like fine electrode configuration (fine stripe pattern), and as a result, the alignment of each pixel is divided. Specifically, when a voltage is applied between the pixel electrode 12 and the counter electrode 22, four (four types of) liquid crystal domains are formed in the liquid crystal layer 3 in each pixel. The azimuths of four directors that are representative of orientations of the liquid crystal molecules 3a included in respective ones of the four liquid crystal domains are different from one another, and therefore, the azimuthal angle dependence of the viewing angle is decreased, so that display of wide viewing angles is realized.

Figure 4:
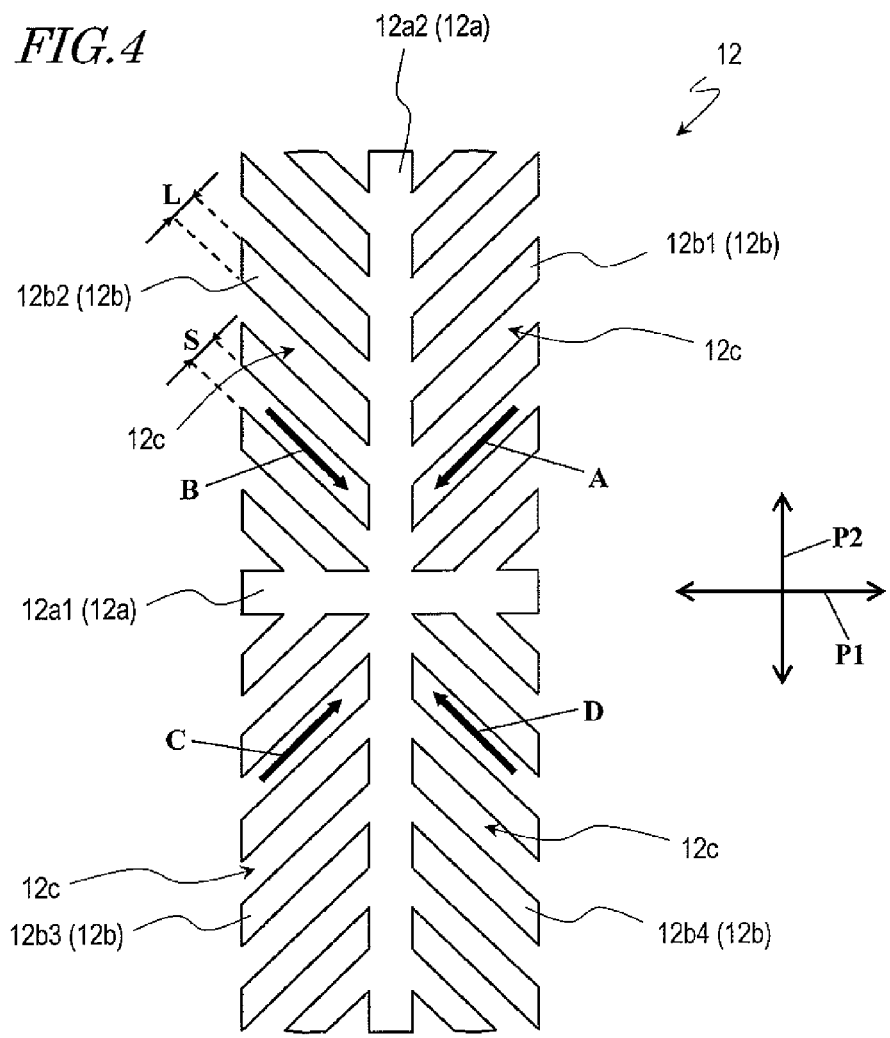
FIG. 4 A plan view schematically showing a pixel electrode 12 of the liquid crystal display device 100.

Now, with further reference to FIG. 4, the relationship between a more specific configuration of the pixel electrode 12 and the azimuths of the directors of the respective liquid crystal domains is described.

As shown in FIG. 4, the trunk portion 12a of the pixel electrode 12 includes a horizontally-extending linear portion (horizontal linear portion) 12a1 and a vertically-extending linear portion (vertical linear portion) 12a2. The horizontal linear portion 12a1 and the vertical linear portion 12a2 intersect with each other (at right angles) at the center of the pixel.

The plurality of branch portions 12b are divided into four groups corresponding to the four regions separated by the cruciform trunk portion 12a. Specifically, supposing that the display surface is the clock dial where the azimuthal angle of 0° is identical with the 3 o'clock direction and that the counterclockwise direction is the positive direction, the plurality of branch portions 12b are divided into the first group that is constituted of branch portions 12b1 extending in the direction of azimuthal angle 45°, the second group that is constituted of branch portions 12b2 extending in the direction of azimuthal angle 135°, the third group that is constituted of branch portions 12b3 extending in the direction of azimuthal angle 225°, and the fourth group that is constituted of branch portions 12b4 extending in the direction of azimuthal angle 315°.

In each of the first, second, third, and fourth groups, both the width of each of the plurality of branch portions 12b, L, and the interval between adjacent ones of the branch portions 12b, S, are typically not less than 1.5 μm and not more than 5.0 μm. From the viewpoint of the stability of alignment of the liquid crystal molecules 3a and luminance, it is preferred that the width L and the interval S of the branch portions 12b are within the above range. Note that the number of the branch portions 12b extending from the horizontal linear portion 12a1 of the trunk portion 12a and the number of the branch portions 12b extending from the vertical linear portion 12a2 are not limited to those shown in FIG. 1 and FIG. 4.

Each of the plurality of slits 12c extends in the same direction as adjacent ones of the branch portions 12b. Specifically, slits 12c provided between the first group branch portions 12b1 extend in the direction of azimuthal angle 45°, and slits 12c provided between the second group branch portions 12b2 extend in the direction of azimuthal angle 135°. Also, slits 12c provided between the third group branch portions 12b3 extend in the direction of azimuthal angle 225°, and slits 12c provided between the fourth group branch portions 12b4 extend in the direction of azimuthal angle 315°.

In the presence of an applied voltage, the azimuth in which the liquid crystal molecules 3a incline (the azimuthal angle component of the long axes of the liquid crystal molecules 3a inclined by an electric field) is defined by an oblique electric field produced in each slit 12c (i.e., a space where the conductive film of the pixel electrode 12 does not exist). This azimuth is parallel to the branch portions 12b (i.e., parallel to the slits 12c) and is identical with a direction toward the trunk portion 12a (i.e., an azimuth which is different by 180° from the extension azimuth of the branch portions 12b). Specifically, the azimuthal angle of the inclination azimuth defined by the first group branch portions 12b1 (first azimuth: arrow A) is about 225°, the azimuthal angle of the inclination azimuth defined by the second group branch portions 12b2 (second azimuth: arrow B) is about 315°, the azimuthal angle of the inclination azimuth defined by the third group branch portions 12b3 (third azimuth: arrow C) is about 45°, and the azimuthal angle of the inclination azimuth defined by the fourth group branch portions 12b4 (fourth azimuth: arrow D) is about 135°. The four azimuths A to D described above are equal to the azimuths of the directors of the respective domains of the 4D structure which are formed in the presence of an applied voltage. The azimuths A to D are generally parallel to any of the plurality of branch portions 12b and form an angle of about 45° with the polarization axes P1 and P2 of the pair of polarizers 40a and 40b. The difference between any two of the azimuths A to D is equal to an integral multiple of 90°. The azimuths of the directors of liquid crystal domains which are adjacent to each other with the trunk portion 12a interposed therebetween (e.g., azimuth A and azimuth B) are different from each other by about 90°.

As described above, since the pixel electrode 12 has the comb tooth-like fine electrode configuration, a plurality of liquid crystal domains are formed in each pixel in the presence of an applied voltage. Thus, the azimuthal angle dependence of the viewing angle is decreased, so that display of wide viewing angles is realized.

Figure 5:
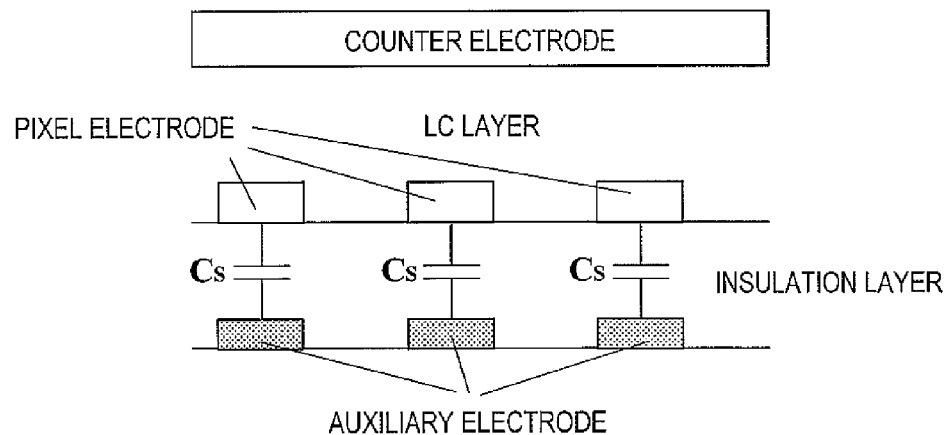
FIG. 5 A diagram schematically showing the storage capacitors $C_S$ of the liquid crystal display device 100.

The TFT substrate 1 of the liquid crystal display device 100 further includes, in addition to the above-described pixel electrodes 12, auxiliary electrodes 13 which are arranged so as to oppose the pixel electrodes 12 via an insulation layer (a third interlayer insulating film 17c which will be described later) as shown in FIG. 1, FIG. 2 and FIG. 3. The auxiliary electrodes 13 are supplied with a potential which is equal to that of the counter electrode 22. The auxiliary electrodes 13 and the pixel electrodes 12 are configured to form storage capacitors $C_S$ as schematically shown in FIG. 5.

Hereinafter, a more specific configuration of the TFT substrate 1 that includes the auxiliary electrodes 13 and the counter substrate 2 which is arranged so as to oppose the TFT substrate 1 is described with again reference to FIG. 1, FIG. 2 and FIG. 3.

The TFT substrate 1 includes, in addition to the pixel electrodes 12 and the auxiliary electrodes 13, TFTs 14 which are electrically coupled to the pixel electrodes 12, scan lines 15 through which scan signals are supplied to the TFTs 14, signal lines 16 through which image signals are supplied to the TFTs 14, and a transparent substrate 11 for supporting these elements.

The transparent substrate 11 is, for example, a glass substrate. A surface of the transparent substrate 11 which is closer to the liquid crystal layer 3 is provided with a base coat film BC. The base coat film BC is made of, for example, SiOx. On the base coat film BC, a semiconductor layer SL is provided which functions as the channel region, the source region, and the drain region of the TFT 14. The semiconductor layer SL may be made of polycrystalline silicon or continuous grain boundary crystal silicon (CGS).

A gate insulating film GI is provided so as to cover the semiconductor layer SL. The gate insulating film GI is made of, for example, SiOx. On the gate insulating film GI, the scan line 15 and a gate electrode GE are provided. The scan line 15 and the gate electrode GE are made of, for example, tungsten (W) or tantalum (Ta). In the present embodiment, the scan line 15 is provided so as to transverse the center of the pixel as shown in FIG. 1. The gate electrode GE is formed so as to branch off from the scan line 15.

An interlayer insulating film (first interlayer insulating film) 17a is provided so as to cover the scan line and the gate electrode GE. The first interlayer insulating film 17a is made of, for example, SiOx. On the first interlayer insulating film 17a, the signal line 16, a source electrode SE, and a drain electrode DE are provided. The signal line 16, the source electrode SE, and the drain electrode DE are made of, for example, titanium (Ti) or aluminum (Al). The gate insulating film GI and the first interlayer insulating film 17a have contact holes CH1 and CH2 through which the source electrode SE and the drain electrode DE are coupled to the source region and the drain region of the semiconductor layer SL as shown in FIG. 2.

An interlayer insulating film (second interlayer insulating film) 17b is provided so as to cover the signal line 16, the source electrode SE, and the drain electrode DE. The second interlayer insulating film 17b is made of, for example, SiOx.

On the second interlayer insulating film 17b, the auxiliary electrode 13 is provided. The auxiliary electrode 13 may be made of a transparent conductive material (e.g., ITO or IZO). As will be described later, the auxiliary electrode 13 has a shape which does not substantially overlap the plurality of slits 12c of the pixel electrode 12 when viewed in a direction normal to the display surface.

An interlayer insulating film (third interlayer insulating film) 17c is provided so as to cover the auxiliary electrode 13. The third interlayer insulating film 17c is made of, for example, SiOx. On the third interlayer insulating film 17c, the pixel electrode 12 is provided. The pixel electrode 12 may be made of a transparent conductive material (e.g., ITO or IZO). The third interlayer insulating film 17c and the second interlayer insulating film 17b have a contact hole CH3 through which the pixel electrode 12 is coupled to a connection portion CP extending from the drain electrode DE as shown in FIG. 2. The pixel electrode 12 is electrically coupled to the drain electrode DE of the TFT 14 via the connection portion CP.

A vertical alignment film 32a is provided so as to cover the pixel electrode 12. On the vertical alignment film 32a, an alignment sustaining layer 34a is provided. A surface of the transparent substrate 11 which is opposite to the liquid crystal layer 3 is provided with a polarizer 40a.

The counter substrate 2 includes, in addition to the counter electrode 22, a color filter CF and a transparent substrate 21 for supporting these elements. The transparent substrate 21 is, for example, a glass substrate. The color filter CF is provided on a surface of the transparent substrate 21 which is closer to the liquid crystal layer 3. On the color filter CF, the counter electrode 22 is provided. A vertical alignment film 32b is provided so as to cover the counter electrode 22, and an alignment sustaining layer 34b is provided on the vertical alignment film 32b. On the other surface of the transparent substrate 21 which is opposite to the liquid crystal layer 3, a polarizer 40b is provided.

Figure 6:
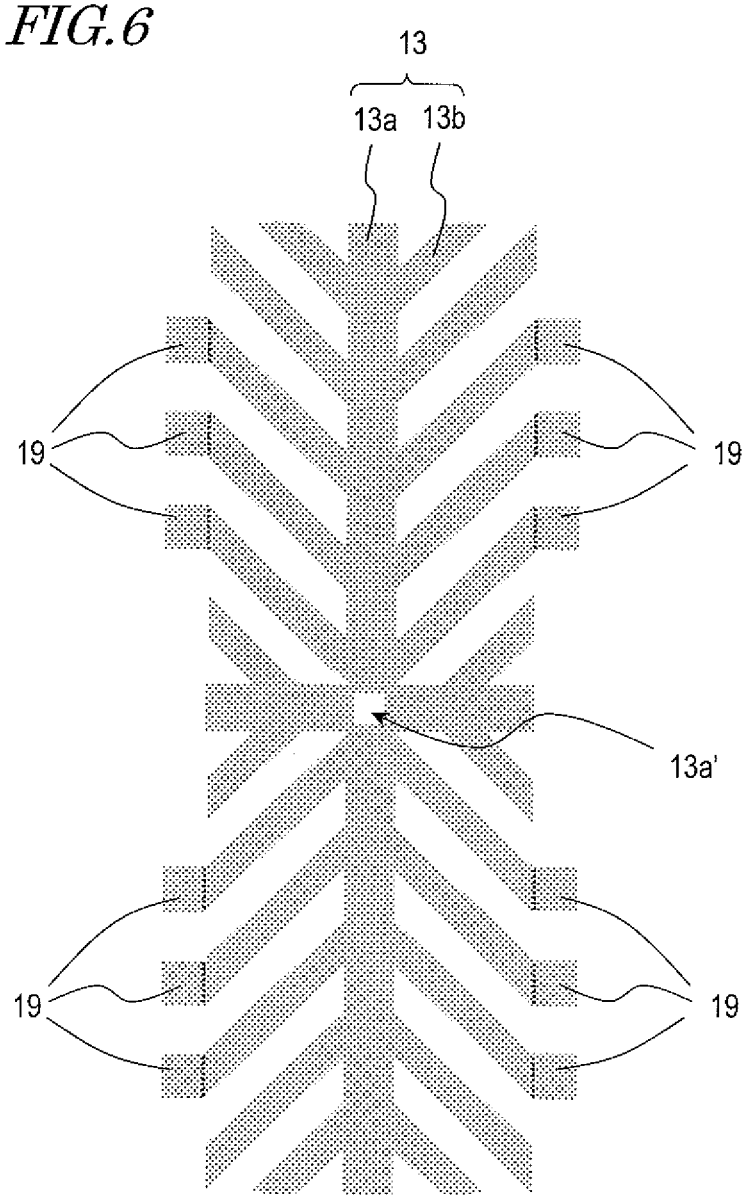
FIG. 6 A plan view schematically showing an auxiliary electrode 13 of the liquid crystal display device 100.

Now, the configuration of the auxiliary electrode 13 of the TFT substrate 1 is described more specifically with additional reference to FIG. 6.

As previously described, the auxiliary electrode 13 has a shape which does not substantially overlap the plurality of slits 12c of the pixel electrode 12 when viewed in a direction normal to the display surface. The shape of the auxiliary electrode 13 is substantially the same as the trunk portion 12a and the plurality of branch portions 12b of the pixel electrode 12 as shown in FIG. 6. Specifically, the auxiliary electrode 13 is constituted of a cruciform trunk portion 13a, which is arranged so as to extend over the trunk portion 12a of the pixel electrode 12, and a plurality of branch portions 13b extending from the trunk portion 13a, which are arranged so as to extend over the plurality of branch portions 12b of the pixel electrode 12.

The trunk portion 13a of the auxiliary electrode 13 has an opening 13a' in a portion corresponding to a region where the pixel electrode 12 and the connection portion CP are coupled to each other. The opening 13a' is provided for the purpose of preventing electrical connection of the pixel electrode 12 and the auxiliary electrode 13. The opening 13a' is greater than the contact hole CH3 (see FIG. 2) that is provided for coupling the pixel electrode 12 to the connection portion CP.

The auxiliary electrode 13 may be made of a transparent conductive material. As the transparent conductive material, for example, ITO or IZO may be used. The thickness of the auxiliary electrode 13 is not limited to any specific value. When the aforementioned transparent conductive material is used, the thickness of the auxiliary electrode 13 is typically about 10 nm to 200 nm. The TFT substrate 1 includes coupling electrodes 19 for electrically coupling the auxiliary electrodes 13 between adjacent pixels, such that all of the auxiliary electrodes 13 in a display region can be supplied with a uniform potential (typically, a potential which is equal to that of the counter electrode 22) from a non-display region (peripheral region). In the present embodiment, the coupling electrodes 19 are integral parts of the auxiliary electrode 13, extending from the branch portions 13b of the auxiliary electrode 13.

In the present embodiment, the coupling electrodes 19 are provided such that the auxiliary electrodes 13 are coupled together between horizontally adjacent pixels. However, alternatively, the coupling electrodes 19 may be provided such that the auxiliary electrodes 13 are coupled together between vertically adjacent pixels. In the present embodiment, the coupling electrodes 19 are parts of the auxiliary electrode 13 extending from the branch portions 13b. However, alternatively, the coupling electrodes 19 may be parts of the auxiliary electrode 13 extending from the trunk portion 13a.

As described above, the TFT substrate 1 of the liquid crystal display device 100 of the present embodiment includes the auxiliary electrodes 13 that are arranged so as to oppose the pixel electrodes 12 via an insulation layer (third interlayer insulating film) 17c. In the liquid crystal display device 100, the auxiliary electrodes 13 and the pixel electrodes 12 (more strictly, together with the insulation layer provided therebetween) are configured to form the storage capacitors $C_S$. The thus-formed storage capacitors $C_S$ do not need to include any nontransparent element (e.g., the storage capacitor line 518 included in the storage capacitor $C_S$ of the liquid crystal display device 500 shown in FIG. 12) and, therefore, can increase the aperture ratio of the pixels, so that the transmittance improves. Thus, bright display can be realized.

The auxiliary electrodes 13 have a shape which does not substantially overlap the plurality of slits 12c of the pixel electrodes 12 when viewed in a direction normal to the display surface. In other words, the auxiliary electrodes 13 are not exposed through the slits 12c of the pixel electrodes 12. Therefore, there is no probability that the effective applied voltage across the liquid crystal layer 3 decreases due to the effects of the potential of the auxiliary electrodes 13.

Furthermore, the auxiliary electrodes 13 of the liquid crystal display device 100 do not need to include any nontransparent element and, therefore, can be formed so as to have a relatively large area. Thus, a sufficiently large storage capacitance value can readily be secured.

In the present embodiment, the shape of the auxiliary electrode 13 is substantially the same as the trunk portion 12a and the plurality of branch portions 12b of the pixel electrode 12 (i.e., a region in which the conductive film of the pixel electrode 12 exists), although the present invention is not limited to this configuration. The auxiliary electrode 13 shown in FIG. 6 may be partially omitted. The overlapping area of the region in which the conductive film of the pixel electrode 12 exists (the trunk portion 12a and the plurality of branch portions 12b) and the auxiliary electrode 13, and the thickness and the material of the insulation layer (third interlayer insulating film) 17c interposed between the pixel electrodes 12 and the auxiliary electrode 13, may be appropriately modified depending on a desired (required) storage capacitance value.

In the example illustrated in the present embodiment, a single 4D structure is formed in one pixel. However, by forming a plural number of the structure shown in FIG. 4 in one pixel, a plurality of 4D structures can be formed in one pixel.

Figure 7:
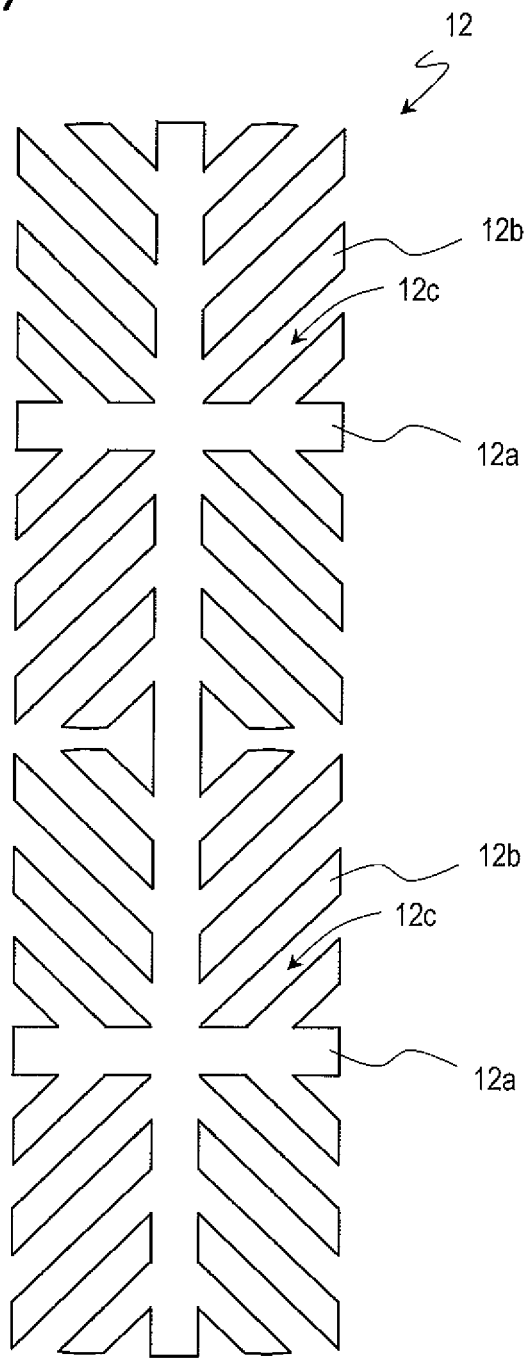
FIG. 7 A plan view schematically showing a pixel electrode 12 of the liquid crystal display device 100.

For example, when the pixel electrode 12 has two cruciform trunk portions 12a as shown in FIG. 7, two 4D structures are formed in one pixel. Thus, the pixel electrode 12 may include at least one cruciform trunk portion 12a.

In the example illustrated in the present embodiment, the TFT 14 is a top gate type TFT. However, a bottom gate type TFT may be used as a switching element provided in each pixel.

Embodiment 2

Figure 8:
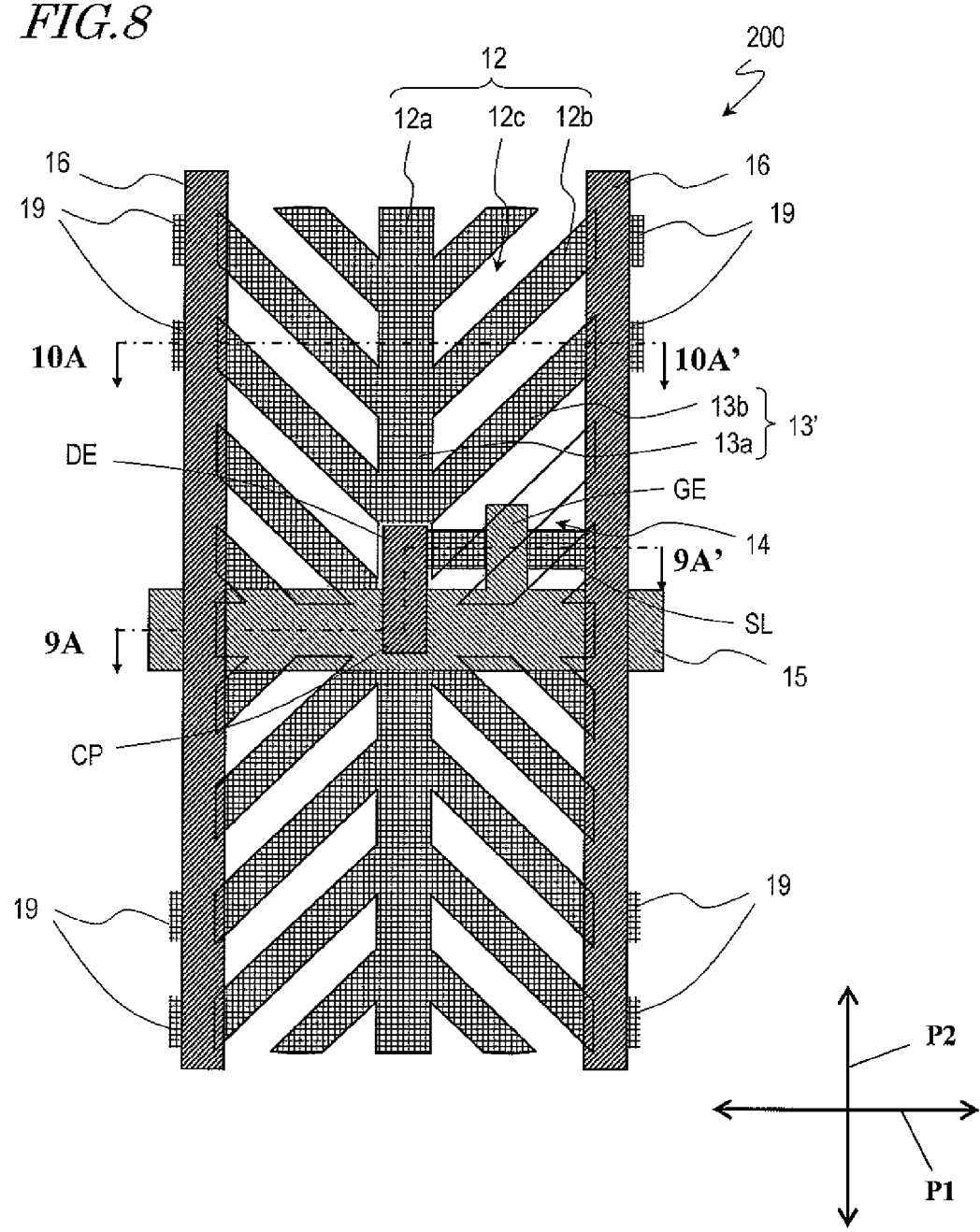
FIG. 8 A plan view schematically showing a liquid crystal display device 200 in a preferred embodiment of the present invention.
Figure 9:
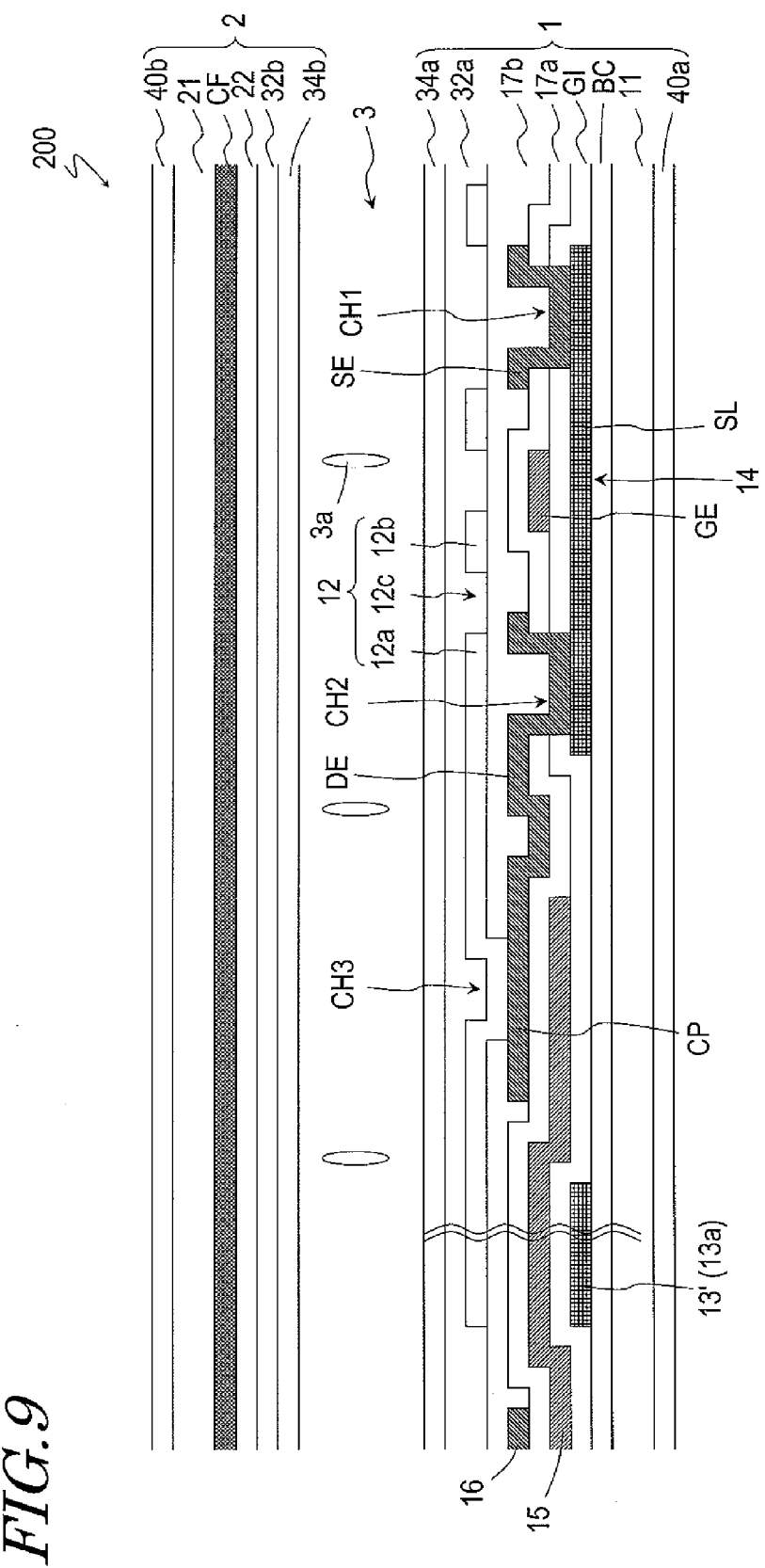
FIG. 9 A cross-sectional view schematically showing the liquid crystal display device 200 in a preferred embodiment of the present invention, which is taken along line 9A-9A' of FIG. 8.
Figure 10:
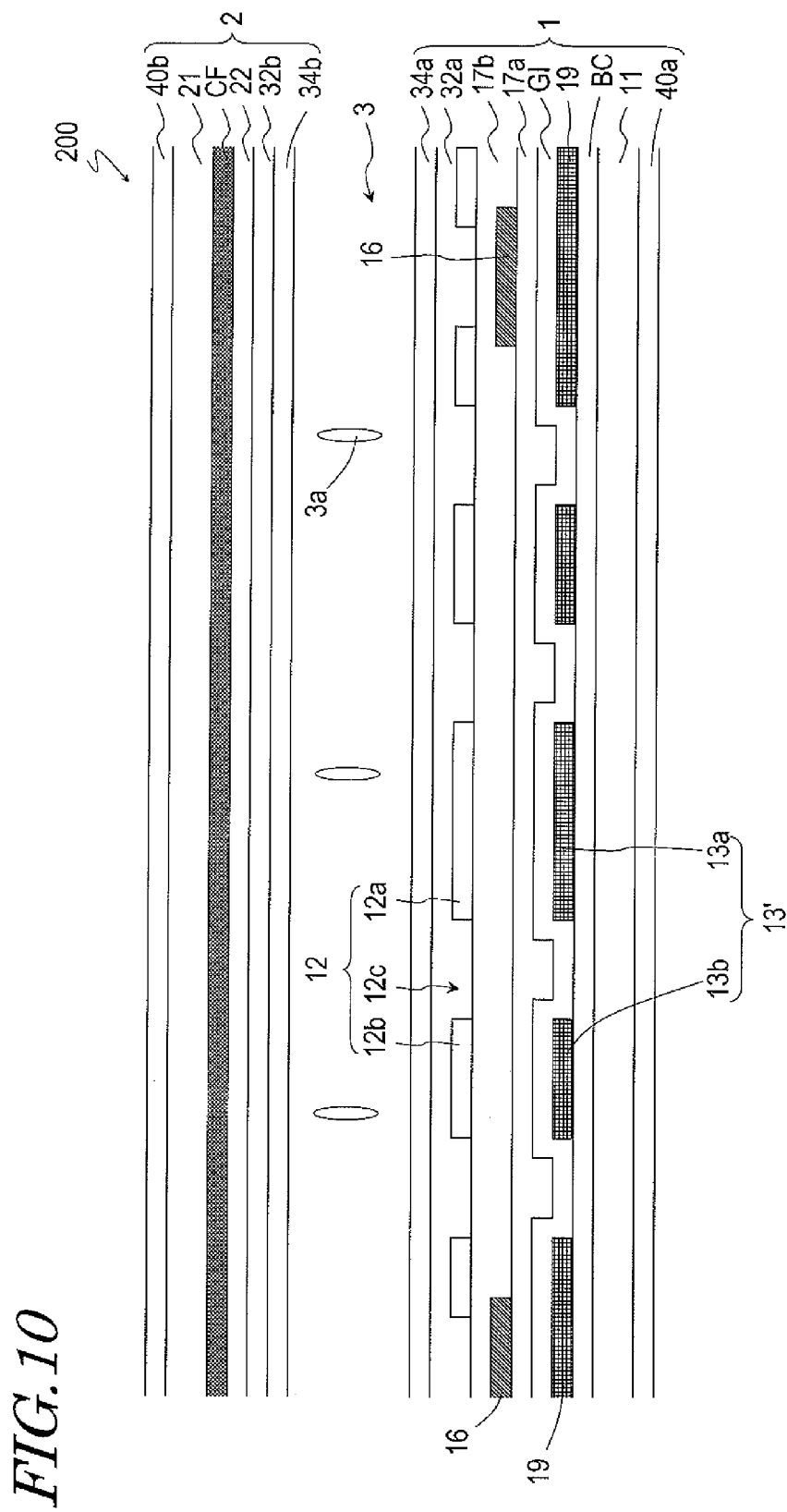
FIG. 10 A cross-sectional view schematically showing the liquid crystal display device 200 in a preferred embodiment of the present invention, which is taken along line 10A-10A' of FIG. 8.

FIG. 8, FIG. 9 and FIG. 10 show a liquid crystal display device 200 of the present embodiment. FIG. 8 is a plan view schematically showing a region corresponding to one pixel of the liquid crystal display device 200. FIG. 9 and FIG. 10 are cross-sectional views taken along line 9A-9A' and line 10A-10A', respectively, of FIG. 8. The descriptions provided below are mainly focused on the differences of the liquid crystal display device 200 of the present embodiment from the liquid crystal display device 100 of Embodiment 1.

The TFT substrate 1 of the liquid crystal display device 200 of the present embodiment includes pixel electrodes 12 which have a comb tooth-like fine electrode configuration as shown in FIG. 8, FIG. 9 and FIG. 10. The pixel electrode 12 includes a cruciform trunk portion 12a which is arranged so as to coincide with the polarization axes P1 and P2 of the pair of polarizers 40a and 40b, a plurality of branch portions 12b extending from the trunk portion 12a in directions of approximately 45°, and a plurality of slits 12c provided between the plurality of branch portions 12b.

The TFT substrate 1 of the liquid crystal display device 200 of the present embodiment further includes auxiliary electrodes 13' which are arranged so as to oppose the pixel electrodes 12 via an insulation layer. The auxiliary electrodes 13' are supplied with a potential which is equal to that of the counter electrode 22. The auxiliary electrodes 13' and the pixel electrodes 12 are configured to form storage capacitors $C_S$ (see FIG. 5). Note that the auxiliary electrodes 13' of the liquid crystal display device 200 are different from the auxiliary electrodes 13 of the liquid crystal display device 100 of Embodiment 1 in that the auxiliary electrodes 13' are made of the same semiconductor material as the semiconductor layer SL of the TFTs 14.

As shown in FIG. 9 and FIG. 10, the auxiliary electrode 13' is provided between a base coat film BC and a gate insulating film GI. The auxiliary electrode 13' is formed in the step of forming the semiconductor layer SL on the base coat film BC (the step of depositing and patterning a semiconductor film). The auxiliary electrode 13' and the semiconductor layer SL are simultaneously formed of the same semiconductor film. The thickness of the auxiliary electrode 13' is, typically, about 10 nm to 200 nm. The liquid crystal display device 100 of Embodiment 1 includes a third interlayer insulating film 17c that is provided to cover the auxiliary electrode 13 formed on the second interlayer insulating film 17b. On the other hand, the liquid crystal display device 200 does not include the third interlayer insulating film 17c because the auxiliary electrode 13' is arranged as described above.

The auxiliary electrode 13' has a shape which does not substantially overlap the plurality of slits 12c of the pixel electrode 12 when viewed in a direction normal to the display surface. Now, a more specific configuration of the auxiliary electrode 13' is described with further reference to FIG. 11.

Figure 11:
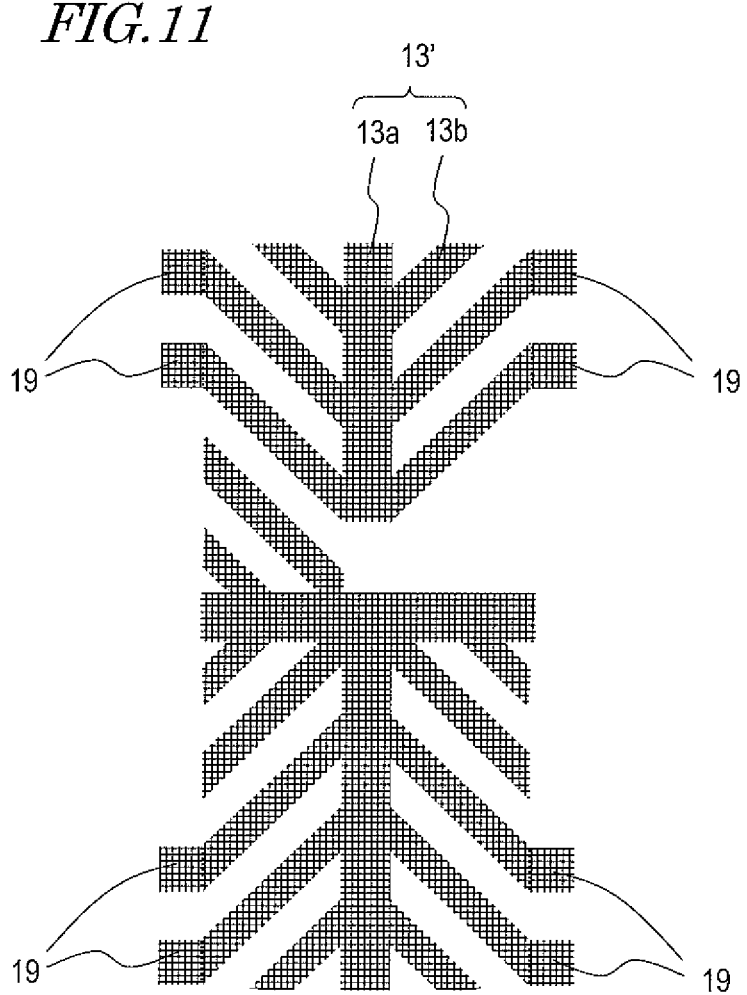
FIG. 11 A plan view schematically showing an auxiliary electrode 13' of the liquid crystal display device 200.

The auxiliary electrode 13' is constituted of a trunk portion 13a which is arranged so as to extend over the trunk portion 12a of the pixel electrode 12 and a plurality of branch portions 13b which are arranged so as to extend over the plurality of branch portions 12b of the pixel electrode 12 as shown in FIG. 11. However, as seen from the comparison of FIG. 11 and FIG. 6, the auxiliary electrode 13' does not have a portion of the trunk portion 13a and some of the branch portions 13b. Specifically, part of the auxiliary electrode 13' which is in the vicinity of the TFT 14 is omitted. This is because, as previously described, the auxiliary electrode 13' itself is provided in the same layer (at the same level) as the semiconductor layer SL of the TFT 14.

Between the auxiliary electrode 13' and the pixel electrode 12, the gate insulating film GI, the first interlayer insulating film 17a and the second interlayer insulating film 17b are provided as shown in FIG. 10. These films function as the insulation layer of the storage capacitor $C_S$. In other words, in the liquid crystal display device 200, the pixel electrode 12, the auxiliary electrode 13', the gate insulating film GI, the first interlayer insulating film 17a, and the second interlayer insulating film 17b form the storage capacitor $C_S$.

The TFT substrate 1 includes coupling electrodes 19 for electrically coupling the auxiliary electrodes 13' between adjacent pixels, such that all of the auxiliary electrodes 13' in a display region can be supplied with a uniform potential (a potential which is equal to that of the counter electrode 22) from a non-display region (peripheral region). In the present embodiment, the coupling electrodes are integral parts of the auxiliary electrodes 13', extending from the branch portions 13b of the auxiliary electrodes 13'.

Figure 12:
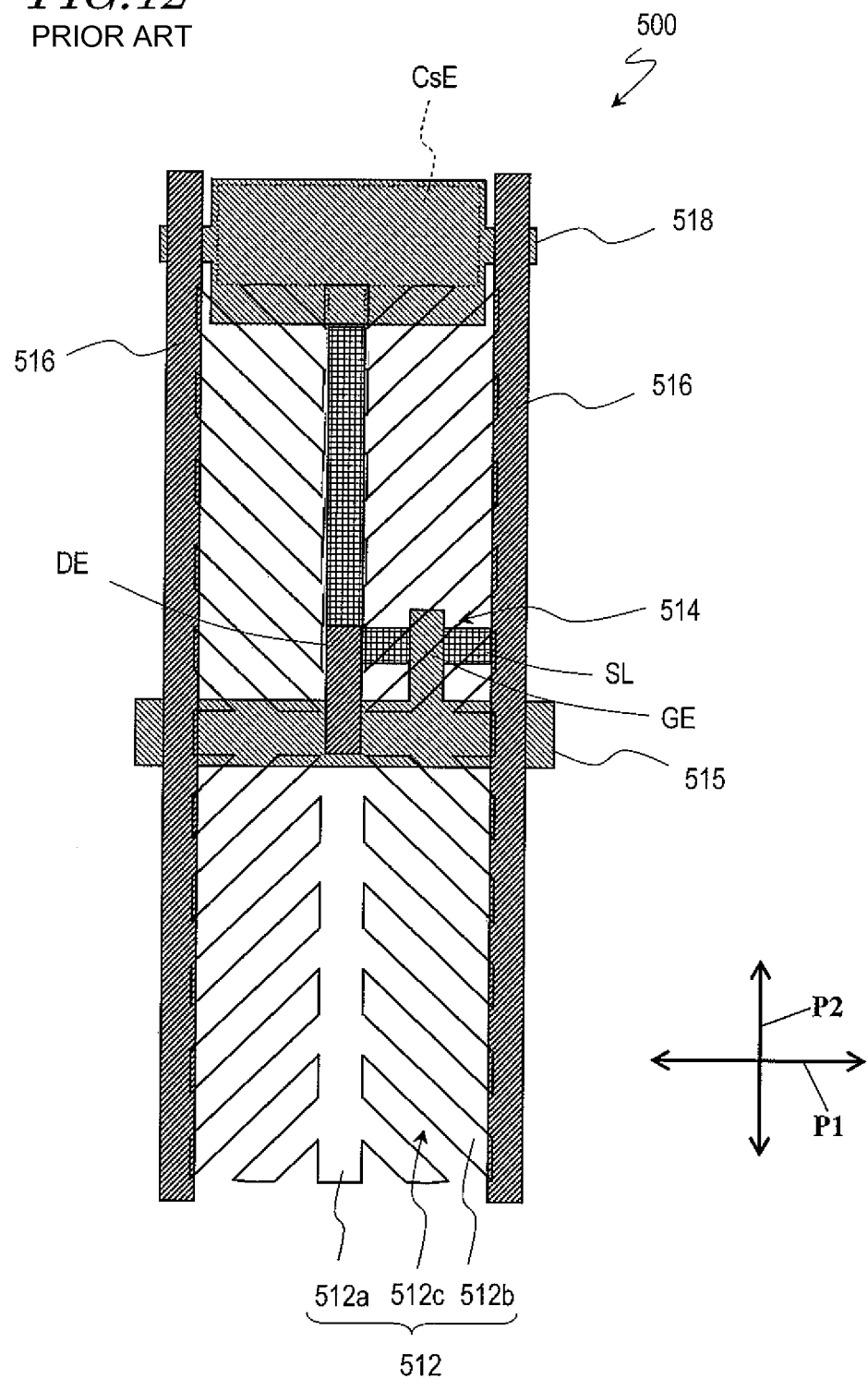
FIG. 12 A plan view schematically showing a liquid crystal display device 500 of the prior art which includes a pixel electrode 512 that has a comb tooth-like fine electrode configuration.
Figure 13:
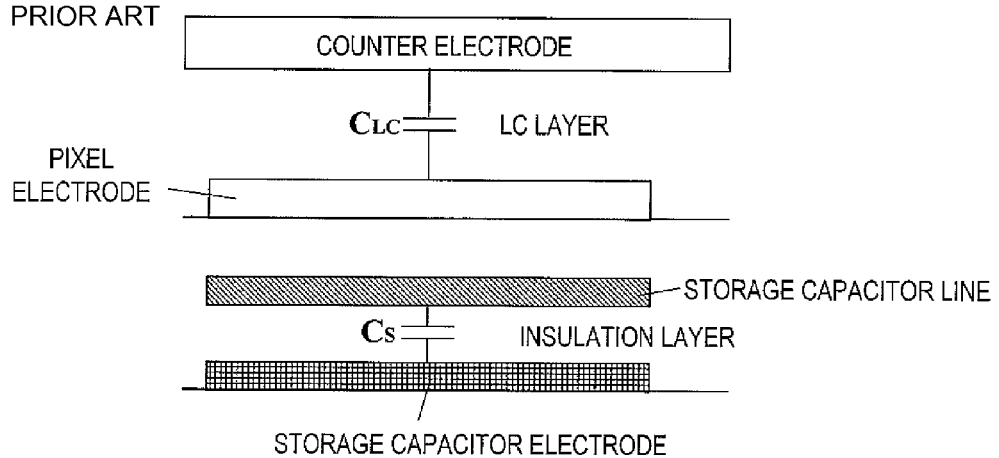
FIG. 13 A diagram schematically showing the storage capacitors $C_S$ of the liquid crystal display device 500.

The liquid crystal display device 200 of the present embodiment includes the above-described auxiliary electrodes 13', so that the storage capacitor line 518 shown in FIG. 12 can be omitted. Thus, the aperture ratio of the pixel can be increased. Thus, the transmittance improves, and bright display can be realized. Further, the auxiliary electrodes 13' have a shape which does not substantially overlap the plurality of slits 12c of the pixel electrodes 12 when viewed in a direction normal to the display surface, and therefore, there is no probability that the effective applied voltage across the liquid crystal layer 3 decreases due to the effects of the potential of the auxiliary electrodes 13. Furthermore, a storage capacitance value can readily be secured.

In the liquid crystal display device 200 of the present embodiment, the auxiliary electrodes 13' are made of the same semiconductor material as the semiconductor layer SL of the TFTs 14. Therefore, the auxiliary electrodes 13' are also formed in the step of forming the semiconductor layer SL. Thus, from the process of fabricating the liquid crystal display device 100 of Embodiment 1, the step of forming the auxiliary electrodes 13 on the second interlayer insulating film 17b and the step of forming the third interlayer insulating film 17c so as to cover the second interlayer insulating film 17b can be omitted. Hence, the liquid crystal display device 200 of the present embodiment can be fabricated through a simpler fabrication process than that of the liquid crystal display device 100 of Embodiment 1.

From the viewpoint of realizing brighter display, it is preferred to provide the auxiliary electrodes 13 that are made of a transparent conductive material as in the liquid crystal display device 100 of Embodiment 1. This is because the auxiliary electrodes 13 that are made of a transparent conductive material, such as ITO or IZO, have higher light transmittance than the auxiliary electrodes 13' that are formed of a semiconductor material. The light transmittance of the auxiliary electrodes 13' that are made of a semiconductor material is about 20% to 80% of the light transmittance of the auxiliary electrodes 13 that are made of the transparent conductive material, although it could vary depending on the specific material and thickness of the electrodes.

In the liquid crystal display device 200 of Embodiment 2, three insulating films (the gate insulating film GI, the first interlayer insulating film 17a, and the second interlayer insulating film 17b) function as the insulation layer of the storage capacitor $C_S$. On the other hand, in the liquid crystal display device 100 of Embodiment 1, only the third interlayer insulating film 17c, i.e., only a single insulating film, functions as the insulation layer of the storage capacitor $C_S$, and therefore, a greater storage capacitance value can be realized.

INDUSTRIAL APPLICABILITY

The present invention is suitably applicable to an alignment-divided liquid crystal display device which includes a vertical alignment type liquid crystal layer. A liquid crystal display device of the present invention is suitably applicable to a display section of various electronic devices, including cell phones, PDAs, notebook PCs, display monitors, and television receivers.

REFERENCE SIGNS LIST 1 active matrix substrate (TFT substrate)
2 counter substrate (color filter substrate)
3 liquid crystal layer
3a liquid crystal molecules
11 transparent substrate
12 pixel electrode
12a trunk portion of pixel electrode
12a1 horizontal linear portion of trunk portion of pixel electrode
12a2 vertical linear portion of trunk portion of pixel electrode
12b, 12b1, 12b2, 12b3, 12b4 branch portion of pixel electrode
12c slit of pixel electrode
13, 13' auxiliary electrode
13a trunk portion of auxiliary electrode
13a' opening
13b branch portion of auxiliary electrode
14 thin film transistor (TFT)
15 scan line
16 signal line
17a insulating film (first interlayer insulating film)
17b insulating film (second interlayer insulating film)
17c insulating film (third interlayer insulating film)
19 coupling electrode
21 transparent substrate
22 counter electrode
32a, 32b vertical alignment film
34a, 34b alignment sustaining layer
40a, 40b polarizer
GE gate electrode
SE source electrode
DE drain electrode
CP connection portion
CH1, CH2, CH3 contact hole
$C_S$ storage capacitor
100, 200 liquid crystal display device

The invention claimed is:

1. A liquid crystal display device which has a plurality of pixels arrayed in a matrix arrangement, comprising:
an active matrix substrate which includes a pixel electrode provided in each of the plurality of pixels;
a counter substrate which has a counter electrode that is arranged so as to oppose the pixel electrode;
a vertical alignment type liquid crystal layer interposed between the active matrix substrate and the counter substrate; and
a pair of polarizers which are arranged so as to oppose each other via the liquid crystal layer and which are in a crossed Nicols arrangement,
wherein the pixel electrode includes a cruciform trunk portion which is arranged so as to coincide with polarization axes of the pair of polarizers, a plurality of branch portions extending from the trunk portion in a direction of approximately 45°, and a plurality of slits provided between the plurality of branch portions,
the active matrix substrate further includes an auxiliary electrode which is arranged so as to oppose the pixel electrode via an insulation layer, the auxiliary electrode and the pixel electrode being configured to form a storage capacitor,
the auxiliary electrode has a shape which does not substantially overlap the plurality of slits of the pixel electrode when viewed in a direction normal to a display surface, and
the auxiliary electrode has a shape which is substantially the same as the trunk portion and the plurality of branch portions of the pixel electrode.

2. The liquid crystal display device of claim 1, wherein the auxiliary electrode is supplied with a potential which is equal to that of the counter electrode.

3. The liquid crystal display device of claim 1, wherein the auxiliary electrode is made of a transparent conductive material.

4. The liquid crystal display device of claim 1, wherein the active matrix substrate further includes a coupling electrode arranged to electrically couple the auxiliary electrodes between adjacent pixels.

5. The liquid crystal display device of claim 1, wherein
in the presence of an applied voltage between the pixel electrode and the counter electrode, four liquid crystal domains are formed in the liquid crystal layer in each of the plurality of pixels,
azimuths of four directors that are representative of orientations of liquid crystal molecules included in respective ones of the four liquid crystal domains are different from one another, and
each of the azimuths of the four directors is generally parallel to any of the plurality of branch portions.

6. The liquid crystal display device of claim 5, wherein
the four liquid crystal domains include a first liquid crystal domain in which the azimuth of the director is a first azimuth, a second liquid crystal domain in which the azimuth of the director is a second azimuth, a third liquid crystal domain in which the azimuth of the director is a third azimuth, and a fourth liquid crystal domain in which the azimuth of the director is a fourth azimuth, a difference between any two of the first, second, third and fourth azimuths being generally equal to an integral multiple of 90°, and
azimuths of directors of liquid crystal domains which are adjacent to each other with the trunk portion interposed therebetween are different by about 90°.

7. The liquid crystal display device of claim 1, further comprising:
a pair of vertical alignment films which are provided between the pixel electrode and the liquid crystal layer and between the counter electrode and the liquid crystal layer; and
a pair of alignment sustaining layers provided on surfaces of the pair of vertical alignment films which are closer to the liquid crystal layer, the pair of alignment sustaining layers being made of a photopolymerized material.

* * * * *